United States Patent [19]

Bernicke et al.

[11] Patent Number: 5,599,368
[45] Date of Patent: Feb. 4, 1997

[54] DEVICE AND PROCESS FOR THE PRODUCTION OF MULTIPLE-FOLD, SINGLE-TUBE GLASS VESSELS

[75] Inventors: Erhard Bernicke; Jurgen Dame; Rainer Munchhausen; Lothar Jungclaus, all of Berlin, Germany

[73] Assignee: Prolux Maschinenbau GmbH, Berlin, Germany

[21] Appl. No.: 193,089

[22] PCT Filed: Jun. 5, 1992

[86] PCT No.: PCT/DE92/00484

§ 371 Date: Jul. 6, 1994

§ 102(e) Date: Jul. 6, 1994

[87] PCT Pub. No.: WO92/21626

PCT Pub. Date: Dec. 10, 1992

[30] Foreign Application Priority Data

Jun. 6, 1991 [DE] Germany ............. 41 19 852.2
Apr. 29, 1992 [DE] Germany ............. 42 14 542.2

[51] Int. Cl.⁶ .................................................. C03B 23/043
[52] U.S. Cl. ............................ 65/42; 65/54; 65/108; 65/155; 65/156; 65/227; 65/244; 65/252; 65/276; 65/280; 313/493; 445/22
[58] Field of Search ............................ 65/36, 42, 54, 65/108, 276, 280, 152, 155, 156, 227, 243, 244, 252; 313/493; 445/22

[56] References Cited

U.S. PATENT DOCUMENTS

| | | |
|---|---|---|
| 1,904,348 | 4/1933 | Barclay ......................... 65/156 |
| 2,418,763 | 4/1947 | Eisler ........................... 65/156 |
| 2,469,681 | 5/1949 | Coby ............................ 65/227 |
| 3,113,010 | 12/1963 | Willis et al. ................. 65/227 |
| 3,215,249 | 11/1965 | Hastings et al. ............. 65/244 |
| 3,257,186 | 6/1966 | Zauner ......................... 65/244 |
| 3,976,463 | 8/1976 | Pei .............................. 65/152 |
| 4,092,142 | 5/1978 | Dichter ......................... 65/227 |
| 4,265,651 | 5/1981 | Morel .......................... 65/252 |
| 4,288,239 | 9/1981 | Hoeh ........................... 65/110 |
| 4,319,906 | 3/1982 | Fix et al. ..................... 65/59.26 |
| 4,337,414 | 6/1982 | Young .......................... 315/56 |
| 4,481,442 | 11/1984 | Albrecht et al. ............. 313/493 |
| 4,801,323 | 1/1989 | Klein et al. ................. 65/108 |
| 4,830,648 | 5/1989 | Klein et al. ................. 65/54 |

FOREIGN PATENT DOCUMENTS

| | | |
|---|---|---|
| 223292 | 6/1985 | German Dem. Rep. . |
| 61-224236 | 10/1986 | Japan . |
| 62-12031 | 1/1987 | Japan . |
| 62-12034 | 1/1987 | Japan . |
| 63-242936 | 10/1988 | Japan . |

Primary Examiner—Donald E. Czaja
Assistant Examiner—Sean Vincent
Attorney, Agent, or Firm—Christie, Parker & Hale, LLP

[57] ABSTRACT

Multiple fold, single tube glass vessels, as well as a process and device for producing multiple fold, single tube glass vessels. An even number of parallel glass tubes open at both ends are assembled under the influence of heat into a multiple fold, single tube glass vessel that is characterized by an essentially constant wall thickness and by an essentially constant inside diameter. The object of the invention is to produce multiple fold, single tube glass vessels suitable in particular as discharge vessels for compact lamps.

17 Claims, 9 Drawing Sheets

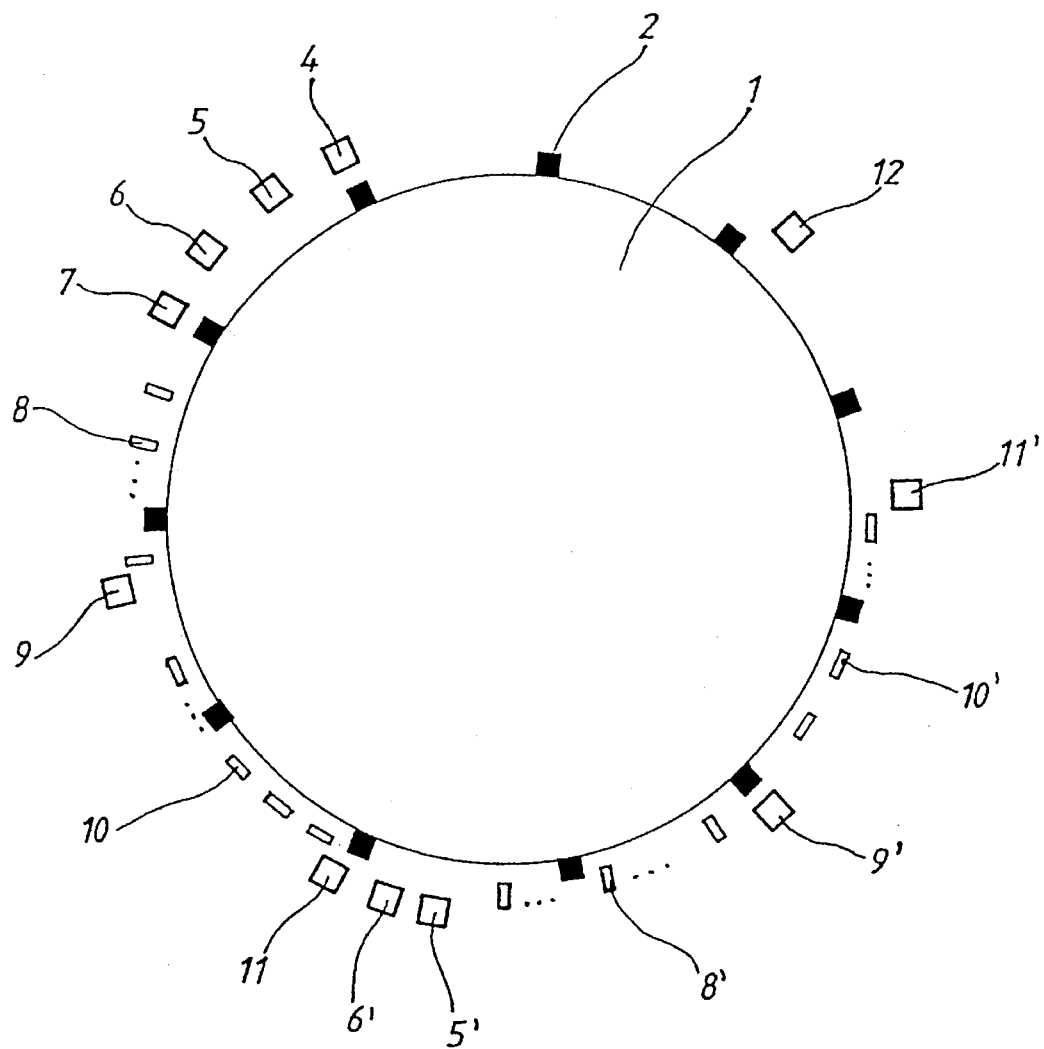

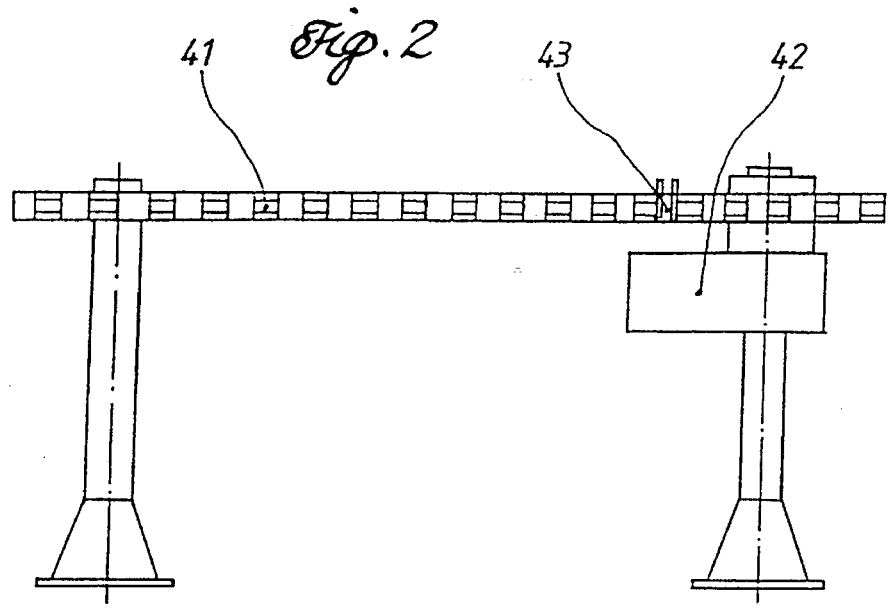
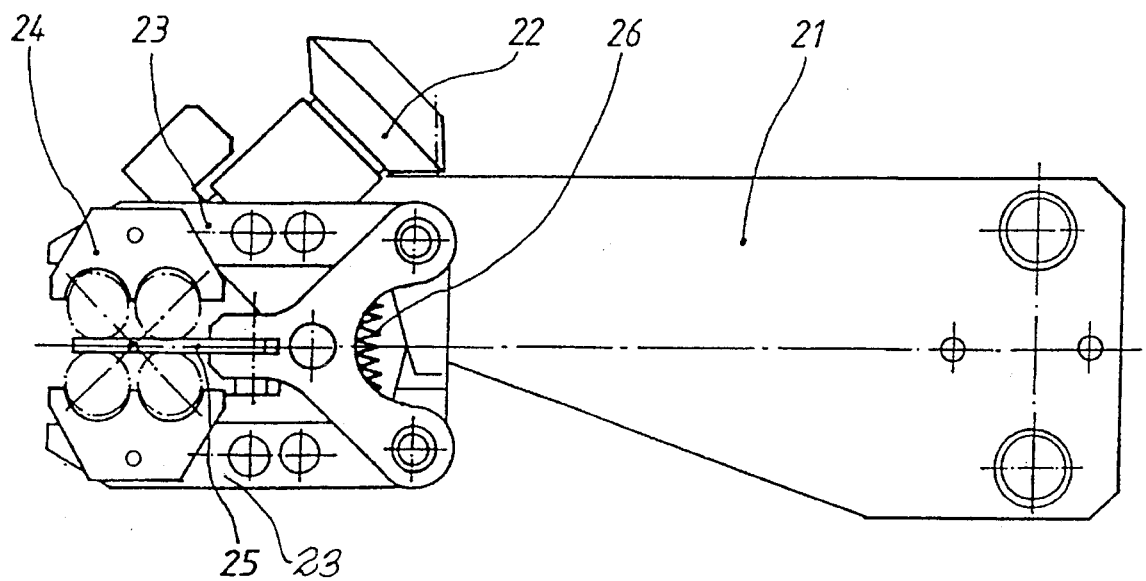

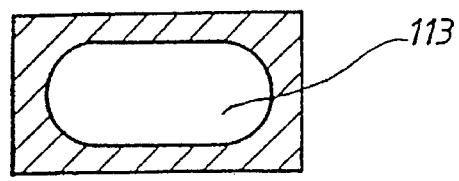
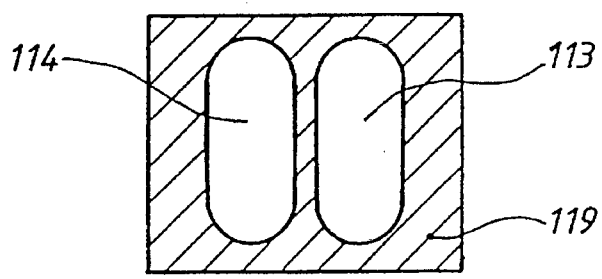
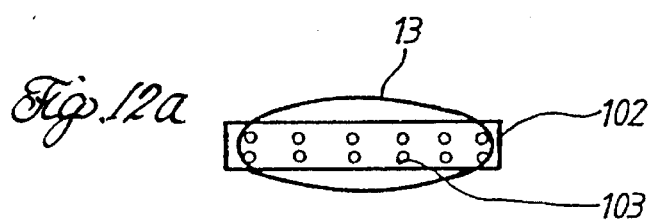
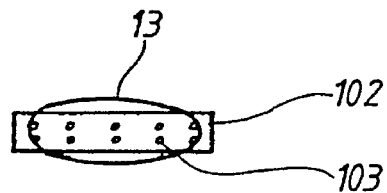
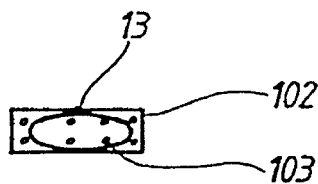

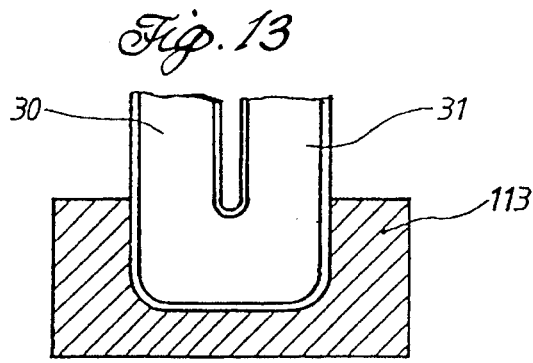
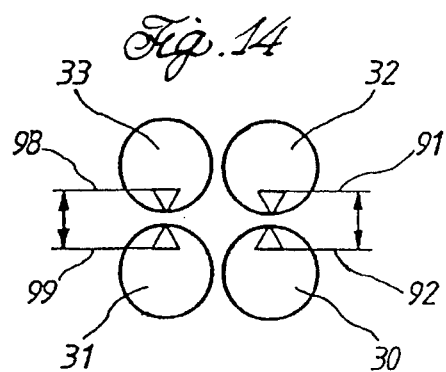
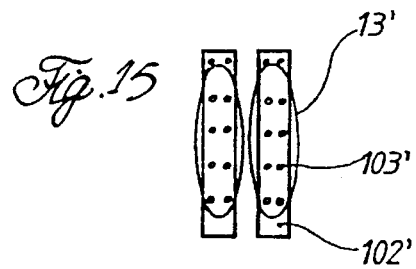
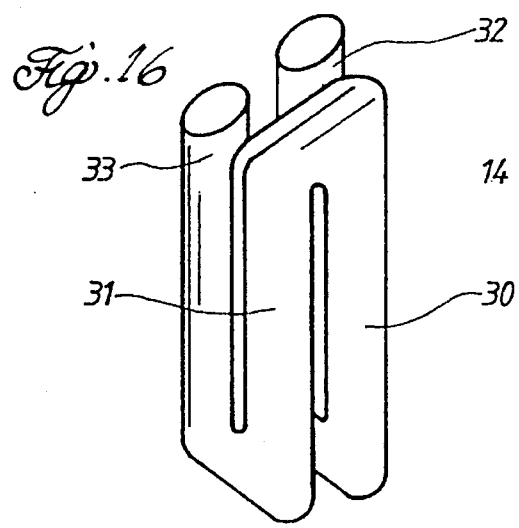

DEVICE AND PROCESS FOR THE PRODUCTION OF MULTIPLE-FOLD, SINGLE-TUBE GLASS VESSELS

FIELD OF THE INVENTION

The invention relates to multiple-fold, single-tube glass vessels, a process for producing multiple-fold, single-tube glass vessels and a device for performing the process.

BACKGROUND OF THE INVENTION

Compact lamps are widely used for producing electric light. In comparison with incandescent bulbs, these lamps are characterized by a higher lighting efficiency and a longer useful life. Compact lamps produce light through a process of gas discharge in a bent discharge vessel.

With known compact lamps, the gas discharge is accomplished by aligning two or more U-shaped tubes in sequence, so that two U-tubes are linked to each other via a hollow connection point at one of their legs (hot-kiss process). There are many disadvantages to this technique.

To begin with, the production of U-tubes presents its own problems. U-tubes are usually produced by bending rod-shaped glass tubes which are open at both ends. This leads unavoidably to an irregular thickness of the walls of the U-tube where it is bent. In particular, the uneven distribution of glass material in the bends produces stresses in the glass, which make it necessary to use expensive handling techniques during the subsequent processing stages, and which represent a prime cause of lamp failure.

Furthermore, a rapid change occurs at the hollow connectors in the strength of the electric field of the positive gas-discharge column. To obtain high efficiency with a compact lamp, however, the strength of the electric field must be constant and steady throughout the length of the positive column. Variations in the strength of the electric field at the hollow connection points cause a reduction in the light output of a compact lamp.

An electric discharge lamp is disclosed in DE OS 30 44 058 using a multiple-fold discharge tube. The U-shaped portions of the discharge tube are produced by bending rod-shaped glass tubes, with the result that the thicknesses of the walls of the discharge tube in these portions are naturally uneven. Although it is recommended to overcome such deformations by injecting a stream of inert gas under pressure into the discharge tube, this step nevertheless can at best correct the diameter of the discharge tube, and not the uneven distribution of glass within the bends.

A process for producing a U-tube is described in GB-PS 668 259, in which two glass tubes, arranged parallel to each other, are heated at their lower and opposing ends. The heated tube ends are connected together mechanically at their opposing sides and are opened lengthwise at their inner sides along a section that corresponds approximately to twice the diameter of the glass tube. The tube ends are then heated using laterally arranged burners, to produce a glass vessel with an oval opening on its lower side.

The cross-sectionally oval opening in the glass vessel is closed by using two opposing burners arranged on either side of the glass vessel to heat the glass externally to its melting point, at a right angle to the longitudinal axis of the glass tube, along a narrow horizontal line. This horizontal line runs at some vertical distance from the opening of the glass tube that corresponds to the glass tube diameter. The glass is then sheared off beneath this horizontal line, and the glass vessel is sealed, leaving a seam. Alternatively, the glass beneath the horizontal line is simply melted by the lateral burners, and the glass so removed collects in a drop and falls to the floor. In this case the glass vessel is sealed by the dripping action of the remnant of glass. The sealed vessel is then shaped by blowing inside a mould.

The particular disadvantage of this process is that the leaving of a glass remnant means a shortening of the glass tube. In this connection, it is a disadvantage of known process that the opposing glass tubes must be opened lengthwise along a section that corresponds to approximately twice the glass tube diameter.

It should be noted that it is not possible, using multiple applications of the known process, to produce a folded single-tube glass vessel so that the two open tube ends lie adjacent to each other. Multiple applications of the known process only make it possible to produce an elongated single-tube glass vessel that is folded along a straight line.

This is related to the fact that with the known process, a glass remnant is removed each time by laterally located burners. Burners must therefore be arranged in a horizontal relation to both sides of the oval-aperture vessels. This however is basically impossible, in cases where the individual sections of a single-tube glass vessel are conducted back and forth, as is necessary if the two open tube ends of a single-tube glass vessel are to lie beside each other. In such cases the area of glass to be processed will be covered up by the presence of other portions of the glass tube, at least on one side of an oval-aperture vessel, so that the laterally arranged burners cannot heat the appropriate area of glass, and the known process fails.

SUMMARY OF THE INVENTION

Starting from this current state of the art, the purpose of the invention is to create an multiple-fold, single-tube glass vessel of the type mentioned, characterized by substantially constant thickness of the walls and a substantially constant interior diameter, as well as a process and a device for producing it.

The multiple-fold single-tube glass vessel in accordance with the invention is characterized by a substantially constant wall thickness and a substantially constant interior diameter, in particular in the U-shaped sections. Such single-tube glass vessels are particularly suitable for use as discharge vessels for compact lamps. The constant interior diameter guarantees a uniform cross-section of the discharge chamber, and thus a superior light output.

BRIEF DESCRIPTION OF THE DRAWINGS

FIG. 1 is a diagrammatic top view of a device according to the invention;

FIG. 2 is a side view of a feeding device for conducting glass tubes;

FIG. 3 is a top view of a gripping and turning clamp for holding four glass tubes;

3

Figure 9:
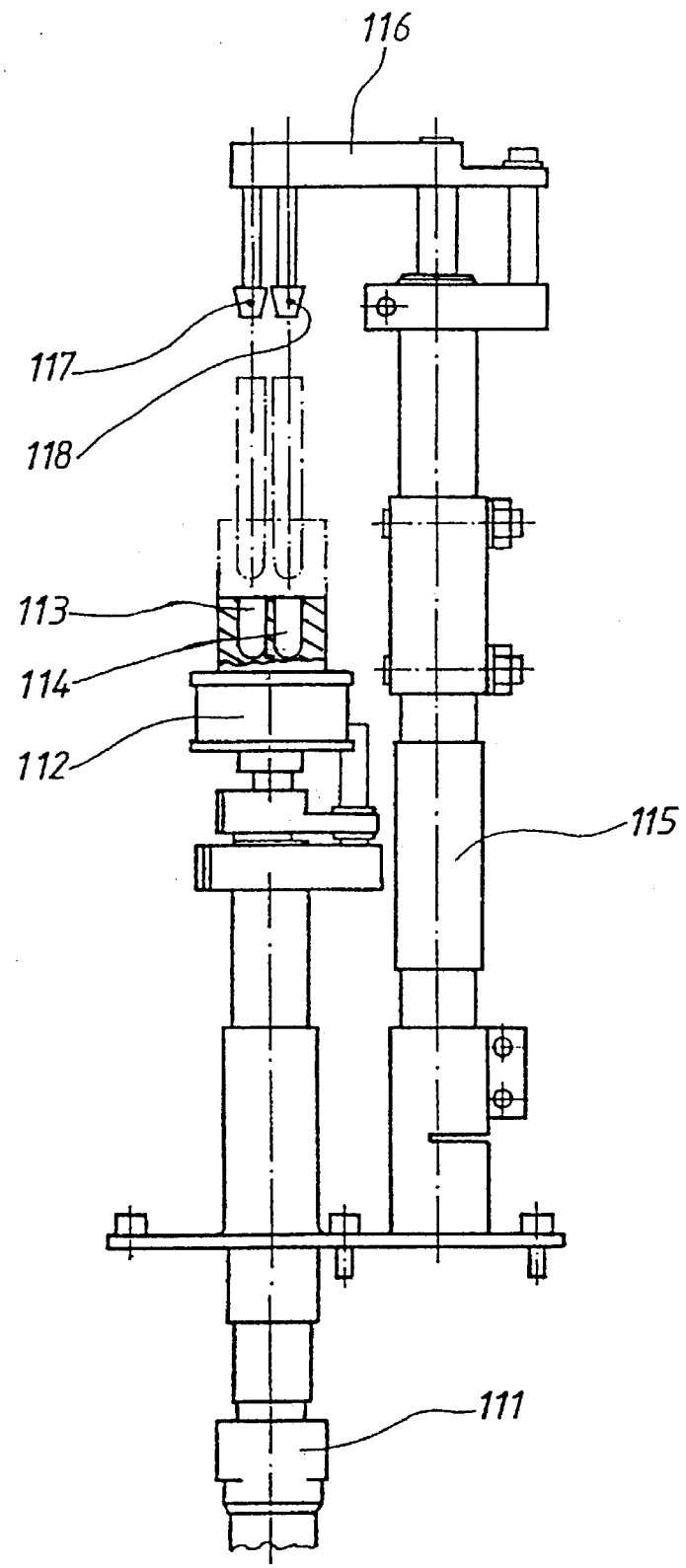

FIG. 9 is a sectional view of a blowing and shaping device;

FIG. 10 is a diagrammatic top view of a closed mould for a blowing and shaping device;

FIG. 11 is a diagrammatic top view of two closed moulds of a blowing and shaping device for connecting the glass tubes after they have been rotated through 180°;

FIG. 12 including FIGS. 12a, 12b, and 12c, is a diagrammatic top view of the oval opening of an oval glass vessel and a fusing burner for three working positions;

FIG. 13 is a diagrammatic sectional view of a closed mould with a formed U-shaped section;

FIG. 14 is a diagrammatic representation of the pressing and opening of a glass tube rotated through 180°;

FIG. 15 is a top view of the diagrammatic arrangement of two oval openings and two fusing burners; and FIG. 16 is a multiple-fold single-tube glass vessel, according to the invention, with four straight parts.

DETAILED DESCRIPTION

The constant wall thicknesses obtained through the invention produce an especially sturdy discharge vessel, that contains only minor stresses in the body of the glass and that has a long useful life. Furthermore, the constant wall thickness means generally that thin-walled glass tubes can be used in the process. This will produce considerable savings in material.

In one advantageous embodiment of the invention, the distance between the adjacent portions of the single-tube glass vessel is 1.6 to 3 mm, in particular 2 mm. The interior diameter of the single-tube glass vessel is preferably between 5 and 15 mm, in particular 12 mm. The preferred wall thickness of the single-tube glass vessel is between 1 and 2 mm.

In the first stage of the process in accordance with the invention two glass tubes, open at both ends, are arranged parallel to each other but not touching, and are simultaneously heated at their lower, opposing ends. The heated tube ends are affixed together mechanically at the sides facing each other, and at the same time are laid open lengthwise at their inner sides beneath this connection point, along a section that is essentially equal to the diameter of the glass tubes. By the application of heat from below, the resulting interfaces of the two glass tubes are driven apart and the connection point of the two tube ends is fused.

The cross-sectionally oval openings of the resulting oval vessels are then each welded shut by the effect of firing from below, with the flame directed into the opening and essentially encompassing the entire opening and in the course of this welding of the oval opening the firing is increasingly focused on the mid-point of the resulting U-shaped section. The resulting U-shaped sections are given their final shape by blowing inside a closed mould. This is followed by a second stage of the process, where all the glass tubes or glass tube pairs are simultaneously rotated by 180° and are affixed to each other and shaped, as described above, so that two open tube ends are left beside each other.

The welding of the oval opening of an oval vessel is thus achieved without producing any drops of glass or the production of any other glass remnants. The welding can furthermore be accomplished without the help of any mechanical tools or equipment.

In a preferred embodiment of the invention, a multiple-fold singletube glass vessel is produced with four straight

4 components using four glass tubes open at both ends. Here, two glass tubes are first connected at their lower ends to form a U-section, after which the unprocessed glass tubes and the glass tube pair thus produced are rotated by 180° and simultaneously a straight portion of each previously created glass tube pair is connected with a hitherto unprocessed glass tube.

It is especially advantageous if the heating of the tube ends is conducted to the point where the glass material can be shaped but is not yet plastic. The binding and opening of the opposing sides of each of the two tube ends can be performed simultaneously or in sequence.

The opening of the opposing sides of each of the two tube ends is preferably preformed by cutting.

So that the two open tube ends of the single-tube glass vessel will lie beside each other, the individual components of the single-tube glass vessel are placed backwards and forwards so that the first and last parts of the single-tube glass vessel lie parallel beside each other.

The welding of the oval opening of an oval vessel is preferably achieved by firing with multiple-point flames. A particularly precise application of the flame is thus possible.

The scope of the invention includes giving the U-shaped sections a rectangular, a serrated or an undulating shape, depending on the shape of the closed mould used for the blowing.

In another embodiment of the invention, glass tubes are selected, open at both ends, that are somewhat longer than the usual glass tubes. In this case, it is advantageous to raise to the same height each of the openings of the tube ends that are to be processed. If the single-tube glass vessels are to be used as discharge vessels for compact lamps, for example, the electrodes can be arranged in the upper ends of the glass tubes.

The device for the performing process consists of a cycle-control robot on which grip-and-turn clamps are fixed at equal intervals for holding the glass tubes to be processed. Corresponding to the individual positions of the cycle-control robot, a feeding device, a height-regulating device, preheating burners, a cutting and pressing device, fusing burners of various apertures and a blowing and shaping device are arranged in sequence and fixed in position.

In addition, behind these and arranged in sequence are a rotating device for turning the glass tubes, a height-regulating device, preheating burners, a cutting and pressing device, fusing burners of various apertures, a blowing and shaping device, and a removal device.

In a preferred embodiment of the device, the cycle-control robot is essentially cruciform when viewed from above. Correspondingly, the individual processing stations are arranged essentially in a circle. This ensures that the work can proceed continuously. It is also within the scope of the invention for the cycle-control robot to be essentially linear when viewed from above, and correspondingly for the individual processing stations to be arranged essentially in a straight line. It is advantageous for the cycle-control robot to have a pneumatic drive, in either case.

In another advantageous embodiment of the device, a rotating device and a positioning device for the glass tubes to be processed are arranged between the height-regulating device and the preheating burners. This makes it possible to rotate the glass tubes into the proper position after they have been picked up by the grip-and-turn clamps, and to place the glass tube sections in pairs at differentially defined heights, so that the processing is made easier.

The feeder device for the glass tubes to be processed consists of a conveyor chain and a pneumatically timed drive, and on this conveyor chain magazines are arranged for holding at least four glass tubes open at both ends.

It is advantageous for each cutting and pressing device to have at least two cutting blades facing each other. A shear-like pair of cutting blades is inserted from below into two open glass tube portions, and cuts these along a section of specified length and connects them simultaneously.

It is advantageous if the fusing burners are multiple-hole burners. Depending on the processing stage, these multiple-hole burners have varying dimensions.

Each blowing and shaping device has two sealing blower nozzles and at least one shaping mould. Gas is blown from the sealing nozzles into two tube sections at a time, so that the corresponding glass tube section is formed into the shape of the mould. Nitrogen, in particular, is used for the gas.

In a desirable application, one of the blowing and shaping devices has n/2 moulds, and the other blowing and shaping device has (n/2–1) moulds, where n equals the number of glass tubes to be processed. In manufacturing a single-tube glass vessel with four straight sections, by way of example, the first-used blowing and shaping device has one mould, and the second blowing and shaping device has two moulds.

The invention is further explained below with reference to the accompanying diagrams that show an example of the invention These show:

The following example of an application of the invention describes the production of multiple-fold single-tube glass vessels with four straight parts.

FIG. 1 shows a device for producing single-tube glass vessels according to the invention. The device shown consists of a cycle-control robot 1 with a cruciform cross-section, designed to operate in rotary motion. The robot has a pneumatic drive. On the outer edge of the robot 1 are gripping and turning clamps 2 arranged at regular intervals for holding the glass tubes 3 to be processed. Each gripping and turning clamp holds four glass tubes 30, 31, 32, 33, that are open at both ends. The arrangement of the four glass tubes 30, 31, 32, 33 here describes the four corners of a square.

Around the periphery of the robot 1 are located, in sequence according to the individual cycle positions of the robot 1, and in fixed position, a feeding device 4, a height-adjustment device 5, a rotating device 6, a positioning device 7, preheating burners 8, a cutting and pressing device 9, fusing burners 10 of various calibres, a blowing and shaping device 22, and again a rotating device 6' a height-adjustment device 5', preheating burners 8', a cutting and pressing device 9' fusing burners 10' of various calibres, a blowing and shaping device 11' and a removal device 12.

As shown in FIG. 2, the feeding device 4 for the glass tubes 3 to be processed consists of a conveyor chain 41 and a pneumatically timed drive 42. Magazines 43 are mounted on the conveyor chain, which hold in position simultaneously four glass tubes 30, 31, 32, 33 open at both ends.

Figure 4:
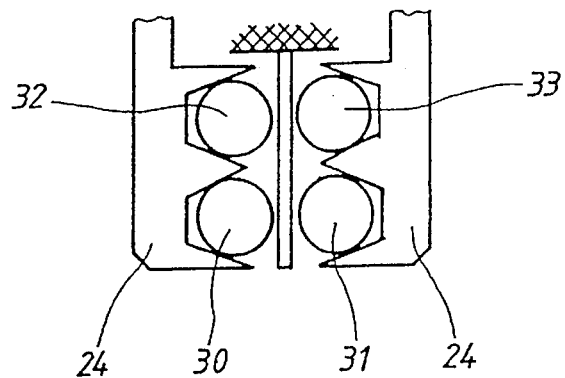
FIG. 4 is a diagrammatic representation of the gripping and turning clamp as shown in FIG. 3, holding four glass tubes.

In FIG. 3 a gripping and turning clamp 2 is shown for holding the four glass tubes 30, 31, 32, 33. The holding and turning clamp consists of a chassis 21, a turning mechanism 22, two clamp arms 23, a pair of prisms 24, a central bridge 25 and a spring 26. The glass tubes 3 are arranged between the two clamp arms 23. When the gripping and turning clamp is turned through 180°, the mid-point of application for the processing of the four glass tubes 3 remains the same. This ensures that each of the two tube ends of the four glass tubes 3 held in the constantly closed gripping and turning clamp 2 can be processed. FIG. 4 shows in diagrammatic form the arrangement of the four glass tubes 30, 31, 32, 33 in the gripping and turning clamps 2.

Figure 5:
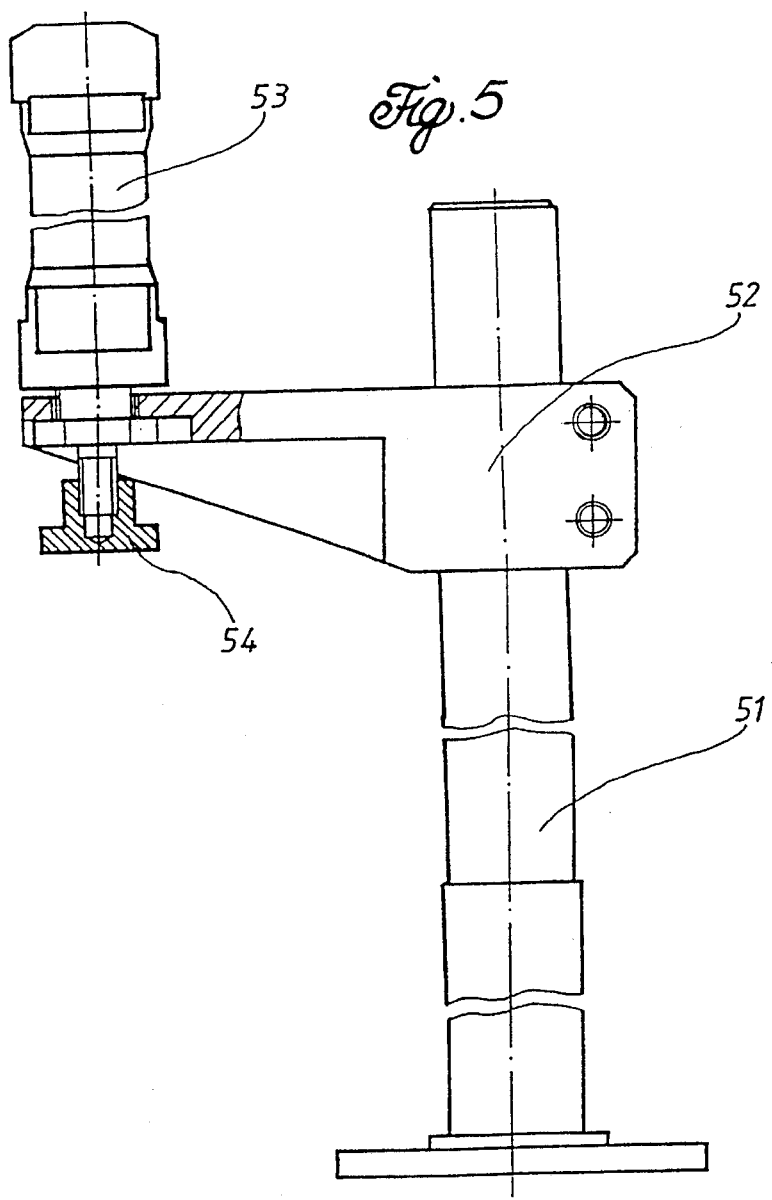
FIG. 5 is a sectional view of a height-adjustment device.

The height-regulating device 5 (FIG. 5) consists of a stand 51, with an adjustable arm 52 on which is fastened a pneumatic work cylinder 53 with a pressure plate 54. The pressure plate makes it possible to train the four glass tubes 3 simultaneously at a specified height. The height of the four glass tubes 3 can thus be adjusted upwards or downwards as required.

Figure 6:
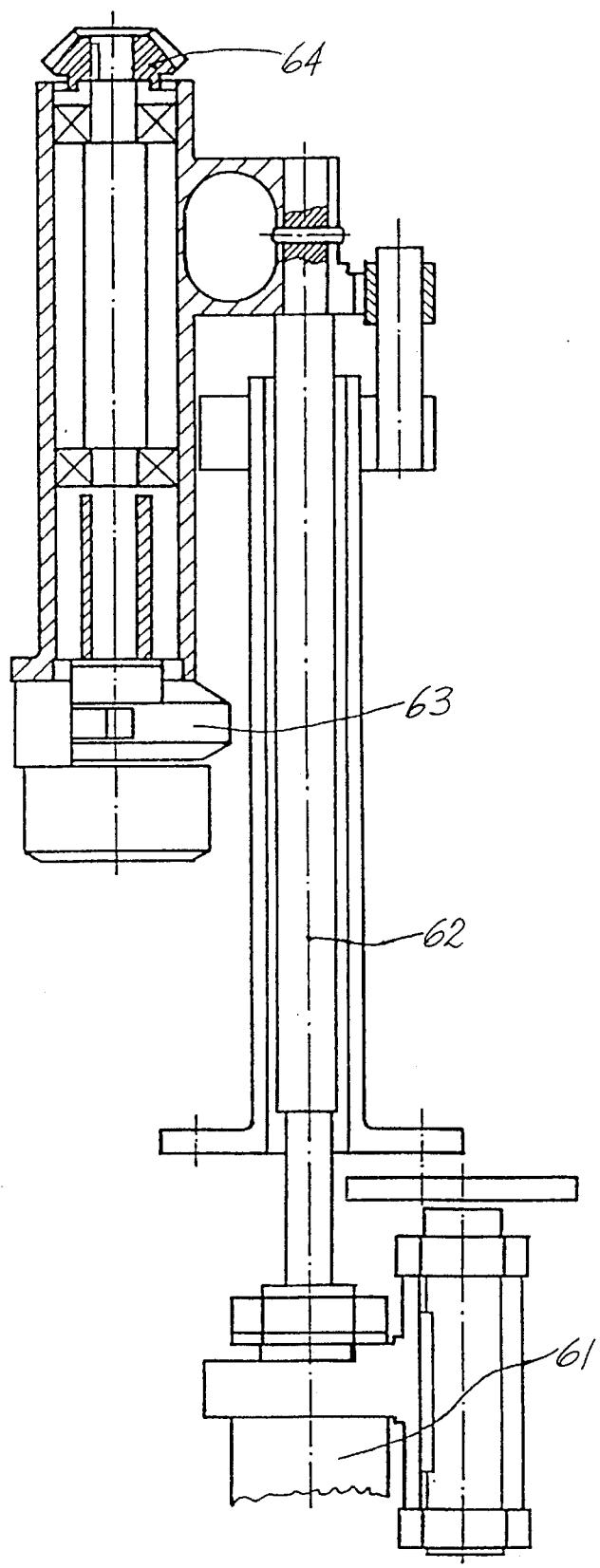
FIG. 6 is a sectional view of a rotating device.

The rotating device 6 shown in FIG. 6 serves to rotate the gripping and turning clamp 2 over the turning mechanism 22 through 180° and also if necessary to rotate it simultaneously by 90° on its own axis. The rotating device 6 has a working cylinder 61 with a lift mechanism 62. A pneumatic rotating device 63 and a bevel wheel 64 are connected to the lift mechanism 62, so that the bevel wheel 64 drives the turning mechanism 22.

Figure 7:
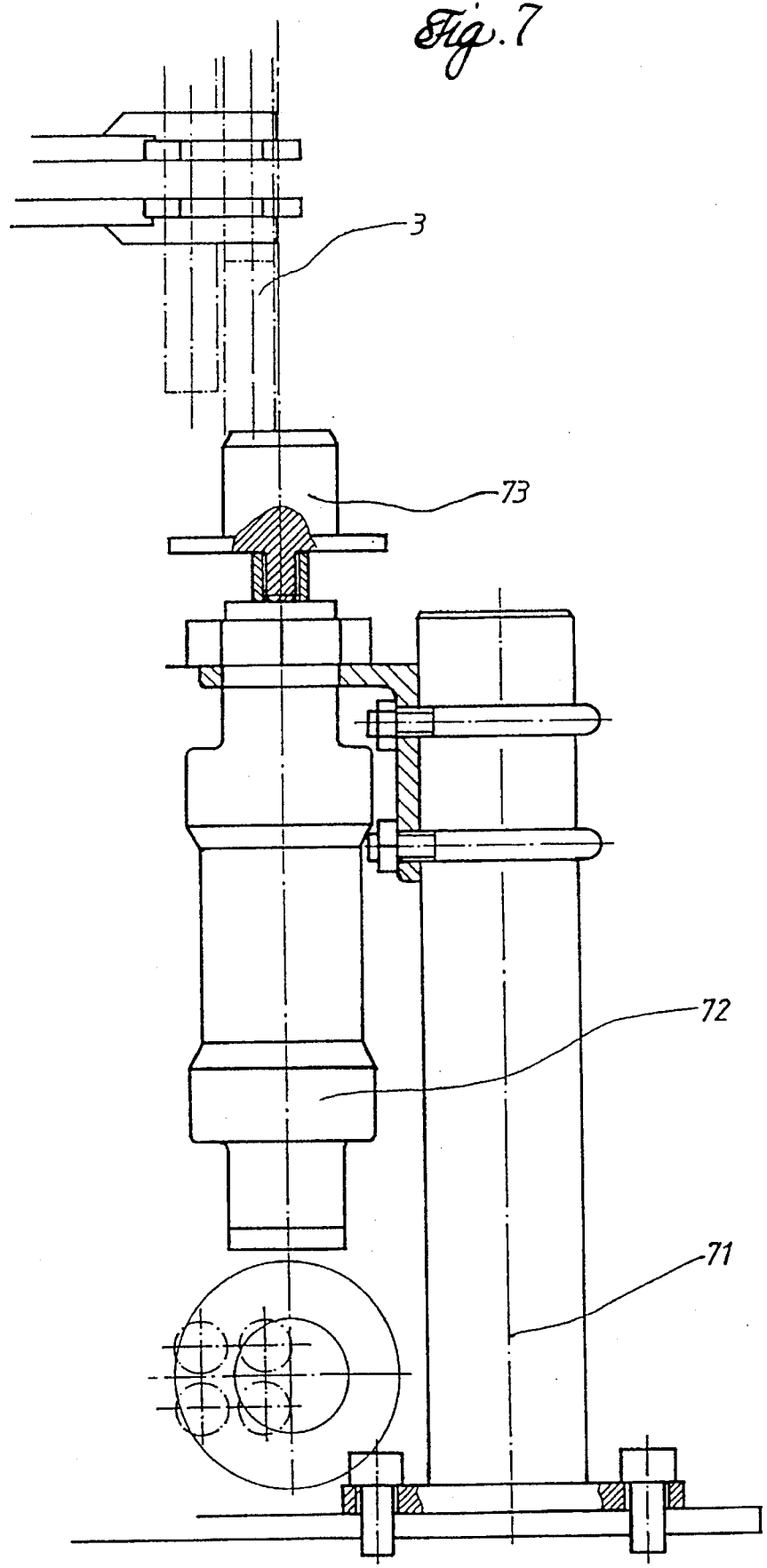
FIG. 7 is a sectional view of a positioning device.

A positioning device 7 (FIG. 7) consists of a stand 71, a pneumatic working cylinder 72 and a positioning head 73. With the help of the positioning head, two glass tubes at a time (30, 31 or 32, 33) are trained at different heights. As an example, the two glass tubes 32, 33 located closer to the robot 1 are raised a short distance, so that the two glass tubes 30, 31 protrude downwards and can be especially easily worked, without disturbing the two glass tubes 32, 33.

Figure 8:
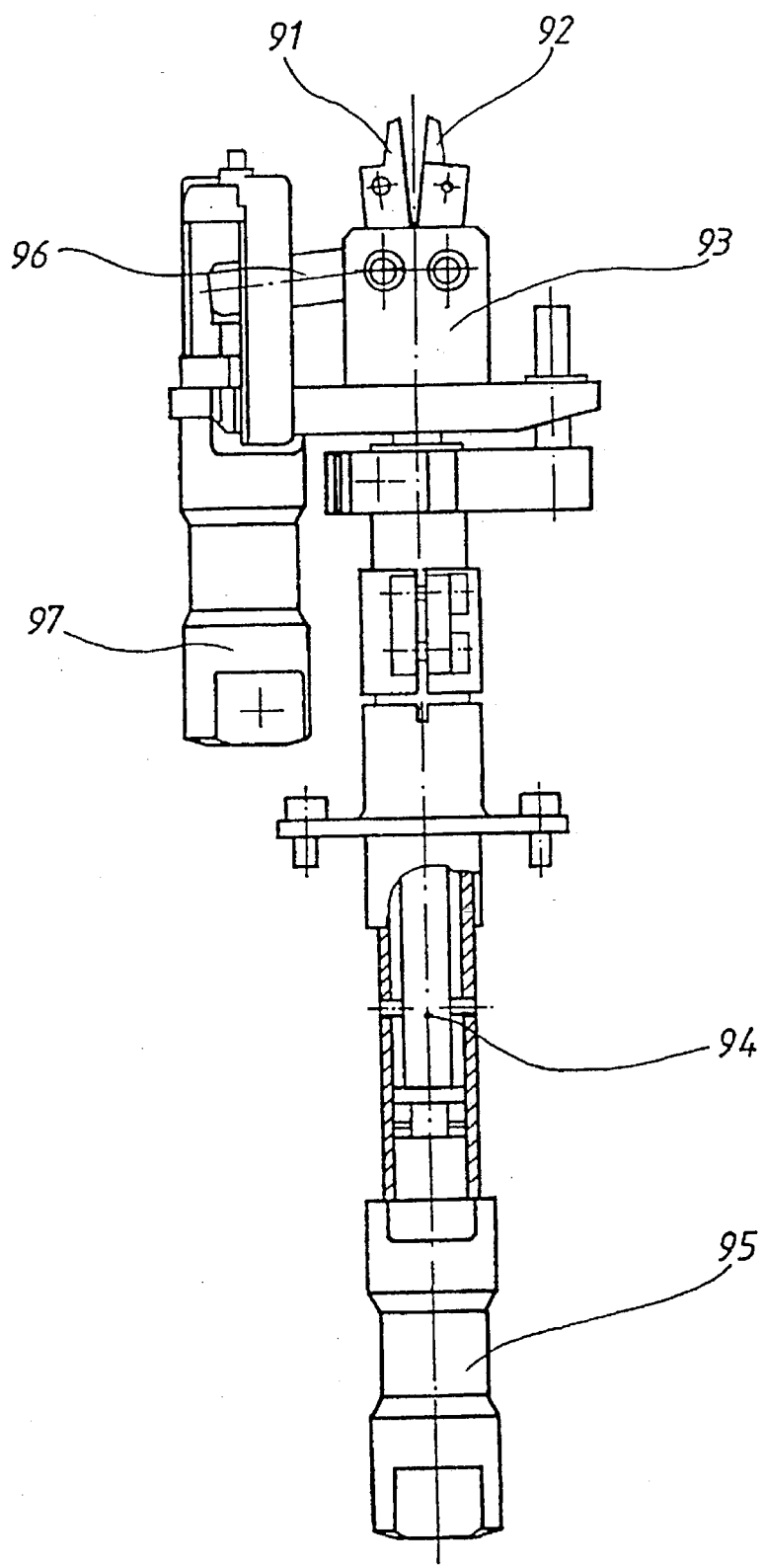
FIG. 8 is a sectional view of a cutting and pressing device.

A cutting and pressing device 9 is shown in FIG. 8. At its upper end are located two shear-like blades 91, 92. The blades 91, 92 are arranged in a blade holder 93 that is attached to a lifting jack 94 connected to a pneumatic lift cylinder 95. The blades 91, 92 are activated by the drive joint 96 of a pneumatic drive cylinder 97. It is also possible for four blades 91, 92, 98, 99 instead of the two blades 91, 92 to be used in the blade holder, arranged so that the four blades 91, 92, 98, 99 represent the corners of a rectangle. One shear-like pair of blades 91, 92 or 98, 99 is introduced each time from below into two open glass tubes 3, and opens them along a section of defined length.

A blowing and shaping device 11 consists of two elements working in tandem, as shown in FIG. 9. The first element consists of a spring-loaded receptacle 112 arranged on a pneumatic lift cylinder 111, that holds two closed moulds 113, 114. It can also be arranged so that there is only one mould 113. The second element has essentially a pneumatic lift-cylinder 115, an arm 116 and two spring-loaded sealing blower nozzles 117, 118.

FIG. 10 shows a top view of a closed mould 113 of a blowing and shaping device 11, and FIG. 11 shows a top view of two closed moulds 113, 114 of a blowing and shaping mould. The two closed moulds 113, 114 make up a double mould 119.

The removal device 12 has, in particular, a clamp opener (not shown) with a pressure pin. To open the gripping and turning clamp 2, the pressure pin is pressed firmly against the clamp arm 23 and in this way opens the pair of prisms 24.

The preheating burners 8 consist of a burner 81 arranged underneath the gripping and turning clamps 2, along with laterally located side burners 82. The fusing burner 10 consists of narrow and sharply focused internal shaping burners 101 and several externally-applied burners of varying widths 102. The interior shaping burner 101 and the external shaping burner 102 are each located underneath the gripping and turning clamp. Multiple hole burners are used as the burners 101, 102.

The individual devices described represent working stations for a series of work stages through which pass the glass tubes 3 that are connected to the robot 1 by the gripping and turning clamps 2, at a pace set by the robot 1.

Four glass tubes 30, 31, 32, 33, open at both ends, are placed in the magazine 43 of the feeding device 4, and are then conveyed to a gripping and turning clamp 2 fastened on the robot 1. The two glass tubes 32, 33 that are turned toward the robot 1 are slightly longer that the glass tubes 30, 31. The distances separating the glass tubes 3 at this point as they lie parallel to each other correspond to those of the single-tube glass vessels that are to be produced.

The glass tubes 3 are trained at a uniform height from above by the height-adjustment device 5, and are then turned through 180° by the rotating device 6. The glass tubes 32, 33 are next moved upwards by the positioning device 7. The two glass tubes 32, 33 remain for the time being in waiting position, while the glass tubes 30, 31, which are now protruding downwards and can be easily worked, are connected to each other.

The two glass tubes 30,31 are then preheated from below by the burners 81 and subsequently heated at their lower and opposing ends by the laterally arranged side burners 82.

The shear-like blades 91, 92 of the cutting and pressing device 9 are inserted into the heated glass tubes 30, 31 from below. The length of the blades corresponds essentially to the diameter of the glass tubes 3. When the two blades 91,92 are pressed together, the opposing sides of the glass tubes 30,31 are joined together at their inner sides, and at the same time are laid open lengthwise underneath the resulting connection point along a distance that is essentially equal to the diameter of the glass tubes 3.

The resulting edges of the cuts in the glass tubes 30, 31 are spread apart from each other by targeted firing from below using the interior shaping burners 101, and the connection point of the glass tubes 30, 31 becomes welded. The two glass tubes 30, 31 are thus bound together into an oval-shaped vessel.

The oval opening 13 of the oval-shaped vessel is then closed using the different shaping burners 102. These shaping burners 102 are located underneath the oval-shaped opening 13, and the firing is directed inside the oval opening 13. As the oval opening 13 is fused shut, the flaming is increasingly focused on the centre portion of the resulting U-shaped section. The fusing of the opening 13 is achieved solely through the heating of the glass, without the need of any mechanical assistance. Furthermore, no glass droplets or any other glass remnants are produced during the fusing of the opening. The welding of the opening 13 results in a closed connection between the glass tubes 30, 31.

FIG. 12 is a diagram of a top view of the oval opening 13 of an oval-shaped vessel and a shaping burner 102 with holes 103 for three different working positions. The oval opening 13 becomes continuously smaller as it is fused, and the respective shaping burner becomes correspondingly continuously narrower, while the respective shaping burner 102 remains focused on the oval opening.

Using the blowing and shaping device 11, the resulting U-shaped section is given final shape by blowing inside the mould 113. To do this, the sealing blower nozzles 117, 118 are applied to the upper openings of the glass tubes 30, 31 and the U-shaped section is blown out with nitrogen. The U-shaped section thus blown out is shown in the diagram in FIG. 13.

Using the rotating device 6', the gripping and turning clamp 2 is then turned through 180° and also rotated through 90° so that the U-shaped tube has its openings pointing downwards. Using the height-adjustment device 5, the four glass tubes 30, 31, 32, 33 are trained at such a height that the downward-pointing tubes ends lie all at the same level.

In the next step, the four lower tube ends are heated with the lateral burners 82' in the same manner as described for the previous work step, and using the cutting blades 91, 92, 98, 99 of the cutting and pressing device 9', two tube ends at a time are connected together at their inner sides and laid open lengthwise beneath the resulting connection point. In this way each of the hitherto untreated glass tubes 32, 33 is connected with a part of the previously produced pair of glass tubes. FIG. 14 gives a diagrammatic presentation of the pressing and laying open of the glass tubes, rotated through 180°.

The two resulting oval openings 13' are closed using internal shaping burners 101' and variable external shaping burners 102', in the manner previously described. The respective burners are arranged as duplex burners, corresponding to the two oval openings 13' to be treated. FIG. 15 shows in diagram form the arrangement of two oval openings 13' with the shaping burner 102'. Next, the two resulting U-shaped sections are blown into final shape in a double mould 119 of the shaping and blowing device 11'.

After the resulting single-tube glass vessel has cooled, it is removed from the holding and turning clamp by the removal device 12.

The resulting multiple-fold single-tube glass vessel 14 (FIG. 16) has an essentially constant interior diameter and essentially constant wall thicknesses, in particular in the U-shaped sections.

In another example of an embodiment, the cycle-control robot 1 is set up not as a stationary rotating unit, but in a linear arrangement. The individual processing stages are in this case arranged essentially in a straight line. A holding and turning clamp 2 moves in a straight line past the processing stations and is returned from the final processing station to the first processing station.

The uses of the invention are not limited to the previously described application examples. A number of possible variations, indeed, can be imagined, for making use of the solution shown in entirely different applications.

We claim:

1. A process for manufacturing a multiple-fold single-tube glass vessel from at least four glass tubes, each open at both ends, and each having a diameter comprising:
   (a) simultaneously heating two of the glass tubes lying parallel to each other with adjacent ends thereof positioned lower than the rest of said two of the glass tubes;
   (b) at adjacent sides of said two of the glass tubes after heating, bonding such tubes together mechanically while cutting such tubes open between each other, from the adjacent ends to a connection point between such tubes along a distance that is essentially equal to the diameter;
   (c) spreading apart said two of the glass tubes at the opening between each other thereby forming an oval opening at the adjacent ends by targeted firing from below the oval opening and at the same time fusing a connection between said two of the glass tubes;
   (d) fusing shut said two of the glass tubes at the oval opening into a closed U-shaped section by firing into and from below the oval opening and essentially encompassing the entire oval opening with fire, and as the oval opening is fused shut focusing the firing increasingly on a middle of the resulting U-shaped section;

(e) shape blowing the resulting U-shaped section in a closed mold; and (f) subsequently turning at least two of the glass tubes simultaneously through a 180° rotation thereby selecting a different combination of at least two of the glass tubes with adjacent ends thereof lower than the rest of the corresponding tubes and repeating steps (a) through (e) until a continuous glass tube is formed having two open ends.

2. A process according to claim 1 wherein all of the glass tubes are rotated together in the step of rotating so that opposite ends of said two of the glass tubes first connected are each connected to different ones of said glass tubes to form additional U-shaped sections, and thereafter the untreated glass tubes and the resulting glass tube pair are rotated through 180° and simultaneously each straight part of the previously manufactured glass tube pair is connected to a previously untreated glass tube.

3. A process a according to claim 2 wherein the fusing shut at the oval opening is performed by using a multiple-point flame.

4. A process according to claim 3 wherein the two glass tubes of the continuous glass tube having the two adjacent open ends are selected so as to be longer than the other glass tubes.

5. A process according to claim 4 wherein the openings of the adjacent ends of each of said two of the glass tubes are each positioned to the same height during the process.

6. A process according to claim 5 wherein the U-shaped sections formed by the repetitions are reshaped into a shape selected from the group consisting of round, rectangular, undulating and serrated shapes.

7. A device for manufacturing multiple-fold single-tube glass vessels from a plurality of glass tubes comprising a cycle-control robot having a plurality of stations arranged sequentially, said plurality of stations comprising: holding and turning clamps for holding the glass tubes, a tube feeder device, a tube height-adjustment device, tube preheaters, a tube cutting and squeezing device for cutting the tube from ends thereof, tube fusing burners of varying widths, a tube blowing and shaping device, a tube rotating device, a tube height-adjustment device, further tube preheaters, a further tube cutting and squeezing device, further tube fusing burners of varying width, a further tube blowing and shaping device, and a tube removal device.

8. A device according to claim 7 wherein the cycle-control robot is shaped substantially as a cruciform when viewed from the top, and the plurality of stations are arranged substantially in a circle.

9. A device according to claim 7 wherein the cycle-control robot is substantially linear when viewed from above, and the individual processing stations are correspondingly arranged substantially in a straight line.

10. A device according to claim 8 further comprising a pneumatic drive for the cycle-control robot.

11. A device according to claim 7 further comprising a pneumatic drive for the cycle-control robot.

12. A device according to claim 7 further comprising a further tube rotating device and a tube positioning device, said further tube rotating device and tube positioning device being disposed between the height-adjustment device and the preheaters.

13. A device according to claim 7 wherein the tube feeder device comprises a pneumatically controlled conveyer chain and a plurality of magazines arranged on the conveyor chain for holding at least four of said glass tubes.

14. A device according to claim 7 wherein each of said tube cutting and squeezing devices and further tube cutting and squeezing devices comprises at least two cutting blades arranged opposite each other.

15. A device according to claim 7 wherein the tube fusing burners and further tube fusing burners are multiple-hole burners.

16. A device according to claim 7 wherein each of said tube, blowing and shaping devices and further tube blowing and shaping devices comprises two tube sealing blower nozzles and at least one tube mold form.

17. A device according to claim 7 wherein one of said blowing and shaping devices and further tube blowing and shaping devices comprises n/2 mold forms, and the other comprises (n/2−1) mold forms, where n equals the number of glass tubes to be processed.

* * * * *